(12) United States Patent
Kosaka et al.

(10) Patent No.: US 10,269,161 B2
(45) Date of Patent: Apr. 23, 2019

(54) VEHICULAR DISPLAY DEVICE AND VEHICULAR DISPLAY METHOD

(71) Applicant: NISSAN MOTOR CO., LTD., Kanagawa (JP)

(72) Inventors: Norio Kosaka, Kanagawa (JP); Tetsuya Yamamoto, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/764,001

(22) PCT Filed: Sep. 28, 2015

(86) PCT No.: PCT/JP2015/077354
§ 371 (c)(1),
(2) Date: Mar. 28, 2018

(87) PCT Pub. No.: WO2017/056157
PCT Pub. Date: Apr. 6, 2017

(65) Prior Publication Data
US 2018/0240258 A1    Aug. 23, 2018

(51) Int. Cl.
*B60W 50/14* (2012.01)
*G06T 11/60* (2006.01)
(Continued)

(52) U.S. Cl.
CPC .............. *G06T 11/60* (2013.01); *B60K 35/00* (2013.01); *B60W 30/14* (2013.01);
(Continued)

(58) Field of Classification Search
CPC ......... G06T 7/70; G06T 19/006; G09G 5/373; G06K 9/00671; G02B 27/01
See application file for complete search history.

(56) References Cited

U.S. PATENT DOCUMENTS

| | | |
|---|---|---|
| 2013/0241747 A1 | 9/2013 | Hatakeyama et al. |
| 2014/0063064 A1 | 3/2014 | Seo et al. |

(Continued)

FOREIGN PATENT DOCUMENTS

| | | |
|---|---|---|
| CN | 102910130 A | 2/2013 |
| JP | 2005-67514 A | 3/2005 |

(Continued)

*Primary Examiner* — Antonio A Caschera
(74) *Attorney, Agent, or Firm* — Osha Liang LLP

(57) ABSTRACT

A vehicular display device which displays a marker image in a manner superimposed on a preceding vehicle in front of a vehicle when the vehicle is following the preceding vehicle while traveling, includes a display configured to display an image in a display area provided to overlap a position of a windshield included in the vehicle, a preceding vehicle detector configured to detect a position of the preceding vehicle, a display processor configured to cause the display to display the marker image corresponding to the position of the preceding vehicle detected by the preceding vehicle detector, and a determiner configured to determine whether the preceding vehicle is located on an inner side of vehicle widthwise side edges of the display area or on outer sides of the vehicle width direction side edges, based on the position of the preceding vehicle detected by the preceding vehicle detector.

14 Claims, 13 Drawing Sheets

(51) Int. Cl.
  *B60K 35/00* (2006.01)
  *G02B 27/01* (2006.01)
  *B60W 30/14* (2006.01)
  *B60W 30/165* (2012.01)
  *G06T 3/20* (2006.01)
  *G06T 3/40* (2006.01)
  *G06T 11/00* (2006.01)

(52) U.S. Cl.
  CPC .......... *B60W 30/165* (2013.01); *B60W 50/14* (2013.01); *G02B 27/01* (2013.01); *G06T 3/20* (2013.01); *G06T 3/40* (2013.01); *G06T 11/001* (2013.01); *B60K 2350/1072* (2013.01); *B60K 2350/1084* (2013.01); *B60K 2350/2052* (2013.01); *B60K 2350/2056* (2013.01); *B60W 2050/146* (2013.01); *B60Y 2400/92* (2013.01)

(56) References Cited

U.S. PATENT DOCUMENTS

| | | |
|---|---|---|
| 2015/0062141 A1 | 3/2015 | Hayasaka |
| 2015/0203036 A1 | 7/2015 | Kajiwara |
| 2016/0152184 A1* | 6/2016 | Ogawa ............... G02B 27/0101 345/589 |
| 2016/0159280 A1* | 6/2016 | Takazawa .............. B60K 35/00 345/8 |
| 2016/0325676 A1* | 11/2016 | Yamada ................. B60Q 9/008 |
| 2017/0011709 A1 | 1/2017 | Kuwabara et al. |

FOREIGN PATENT DOCUMENTS

| | | |
|---|---|---|
| JP | 2009-040107 A | 2/2009 |
| JP | 2013-131178 A | 7/2013 |
| JP | 2015-003706 A | 1/2015 |
| JP | 2015-011666 A | 1/2015 |
| JP | 2015-049842 A | 3/2015 |
| JP | 2015-128202 A | 7/2015 |
| JP | 2015-135591 A | 7/2015 |
| JP | 2015-197706 A | 11/2015 |
| KR | 20120116876 A | 10/2012 |
| WO | 2014/208008 A1 | 12/2014 |
| WO | 2015/001796 A1 | 1/2015 |
| WO | 2015/004784 A1 | 1/2015 |
| WO | 2015/136874 A1 | 9/2015 |

* cited by examiner

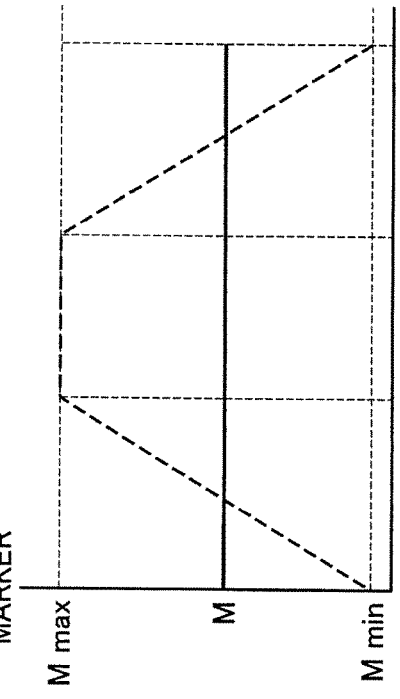
FIG. 8D
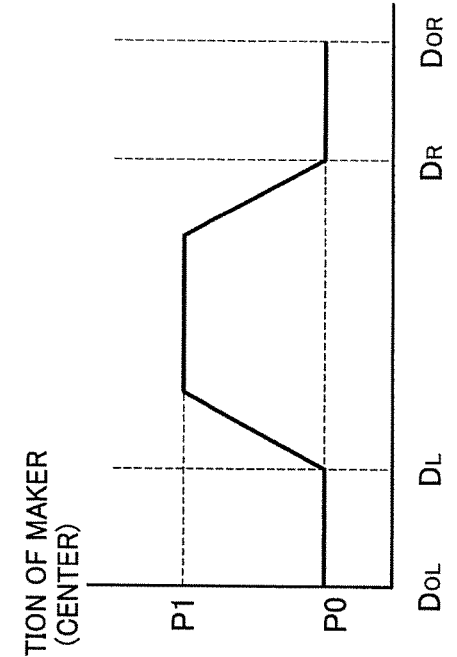
FIG. 8E
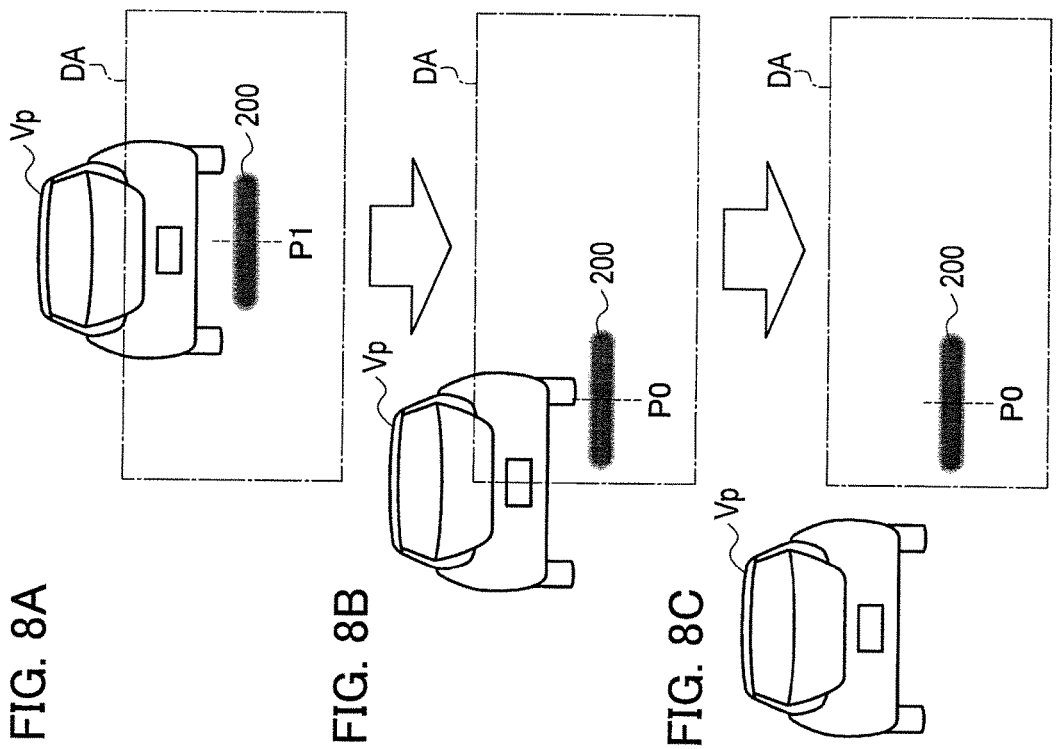
FIG. 8A
FIG. 8B
FIG. 8C

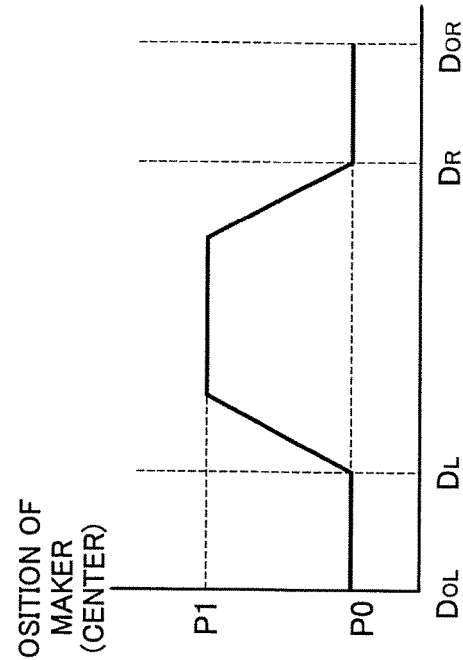
FIG. 9D
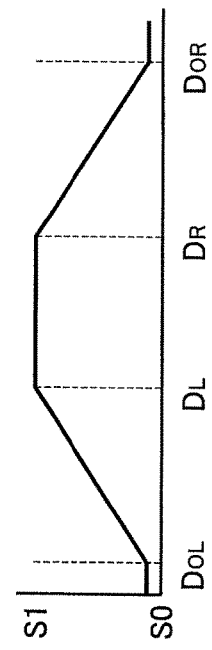
FIG. 9E
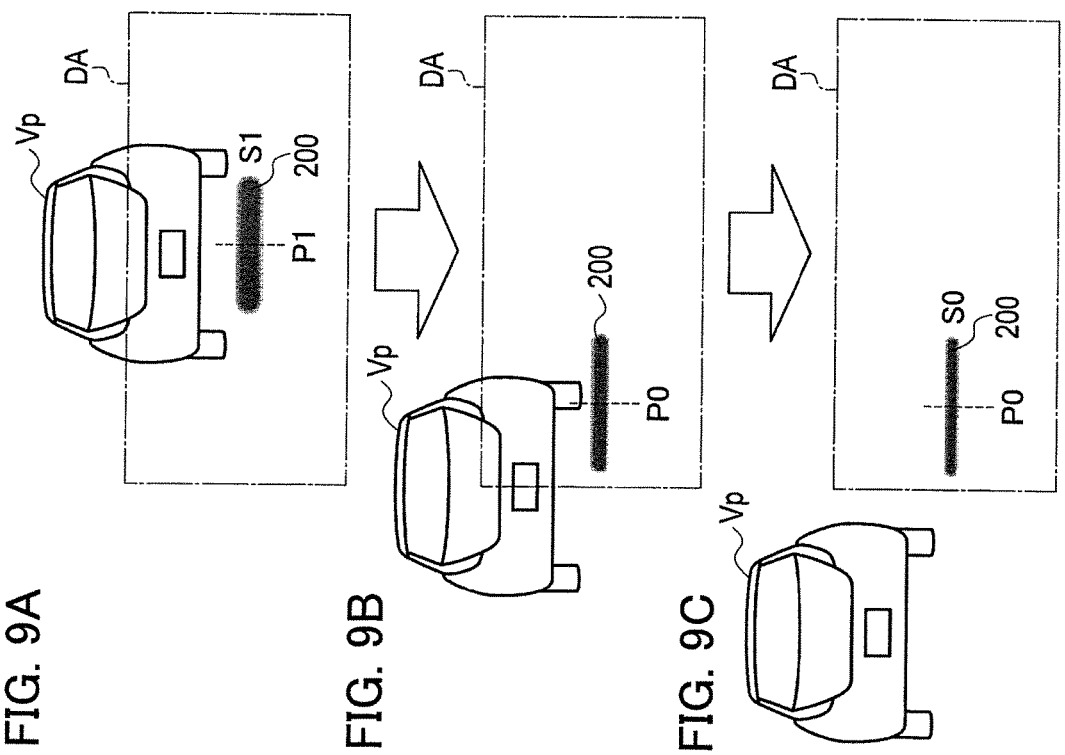
FIG. 9A
FIG. 9B
FIG. 9C

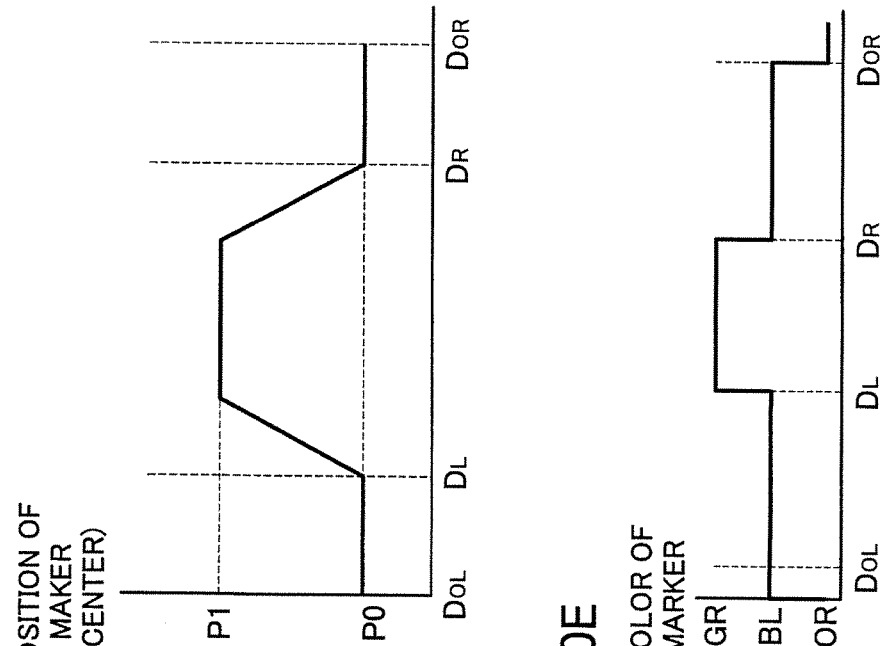
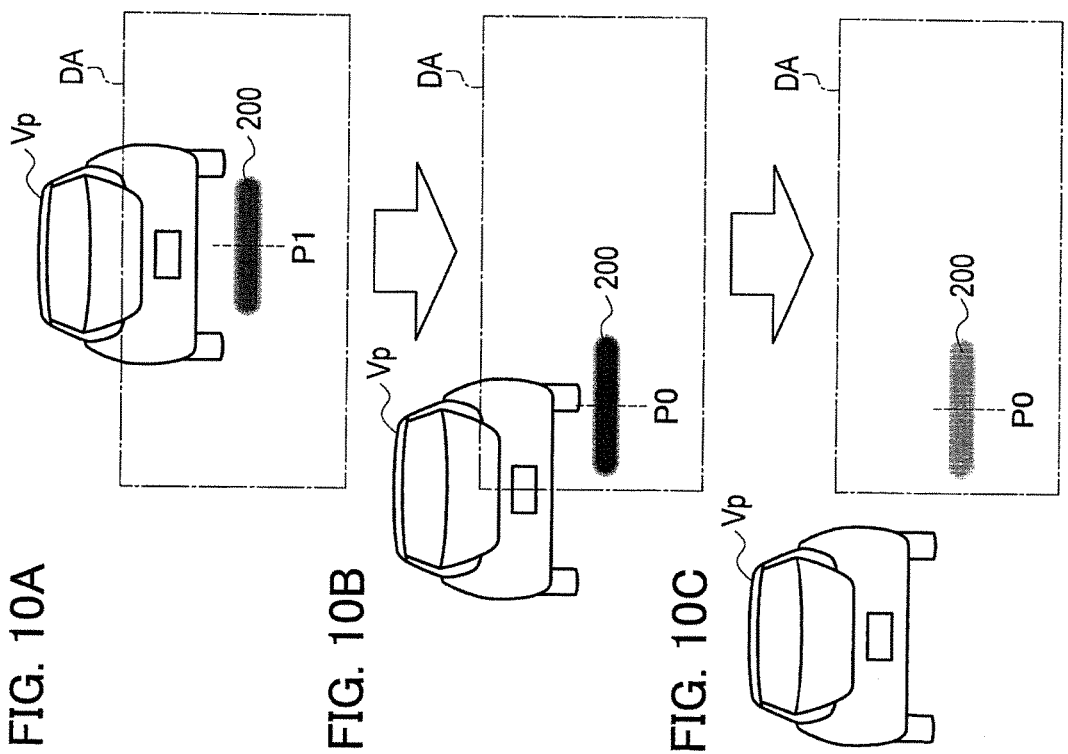

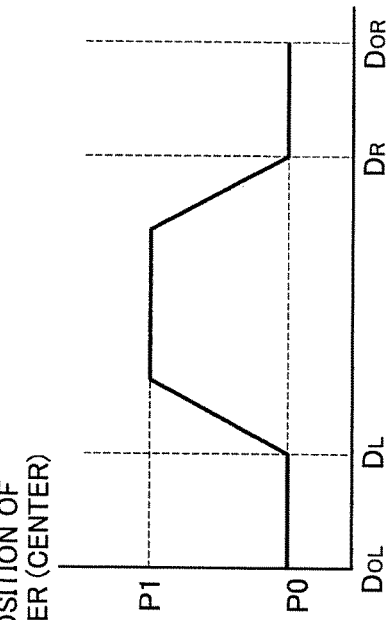
FIG. 11D POSITION OF MAKER (CENTER)
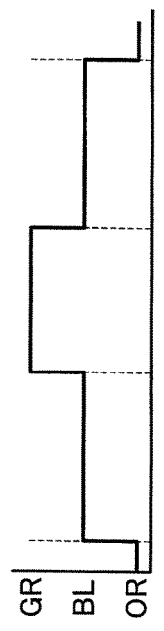
FIG. 11E COLOR OF MARKER
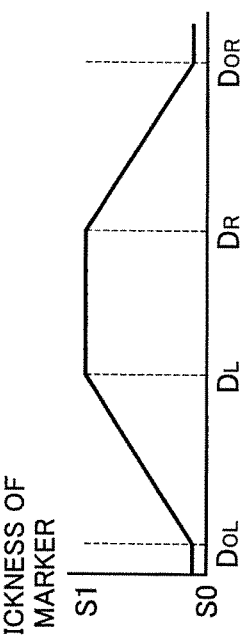
FIG. 11F THICKNESS OF MARKER
FIG. 11A
FIG. 11B
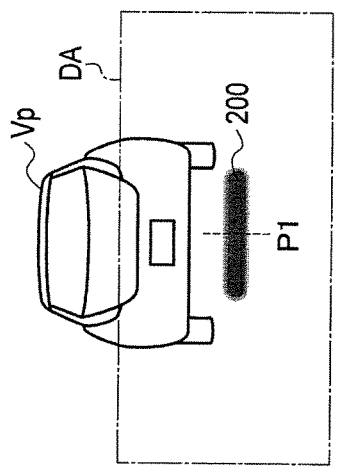
FIG. 11C
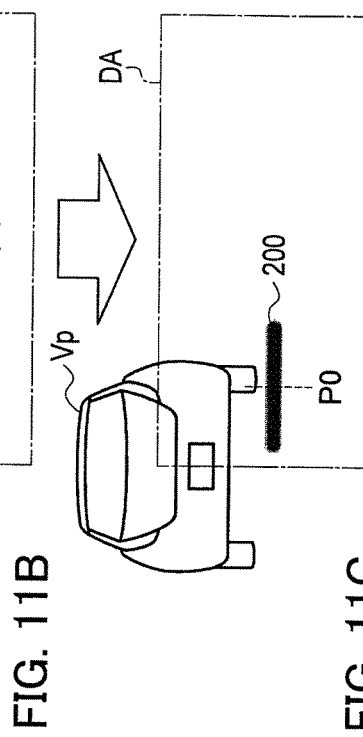
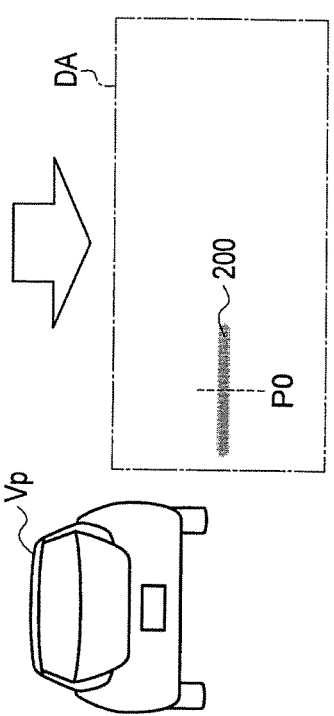

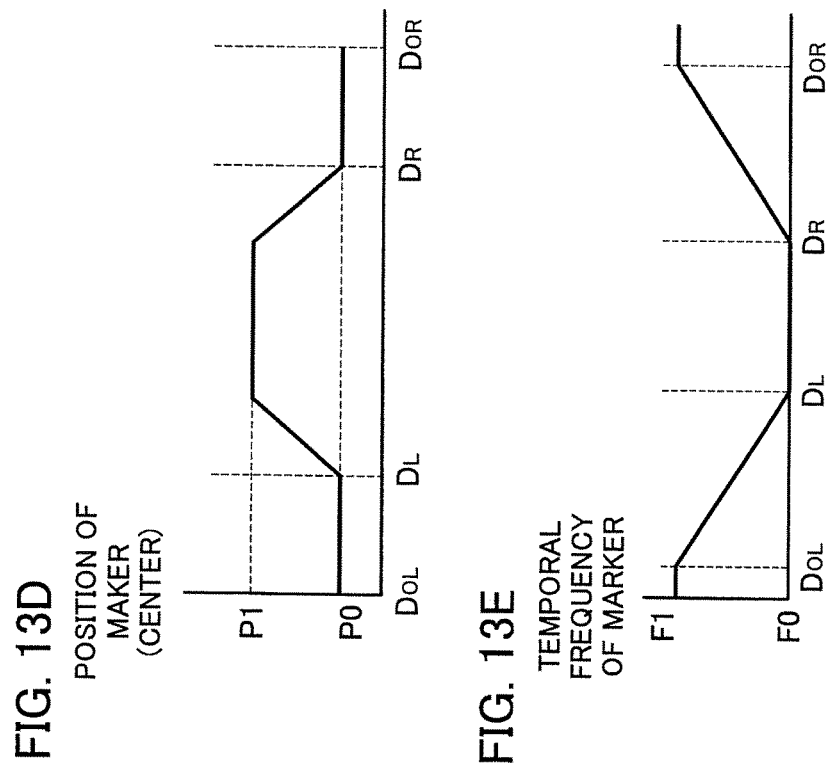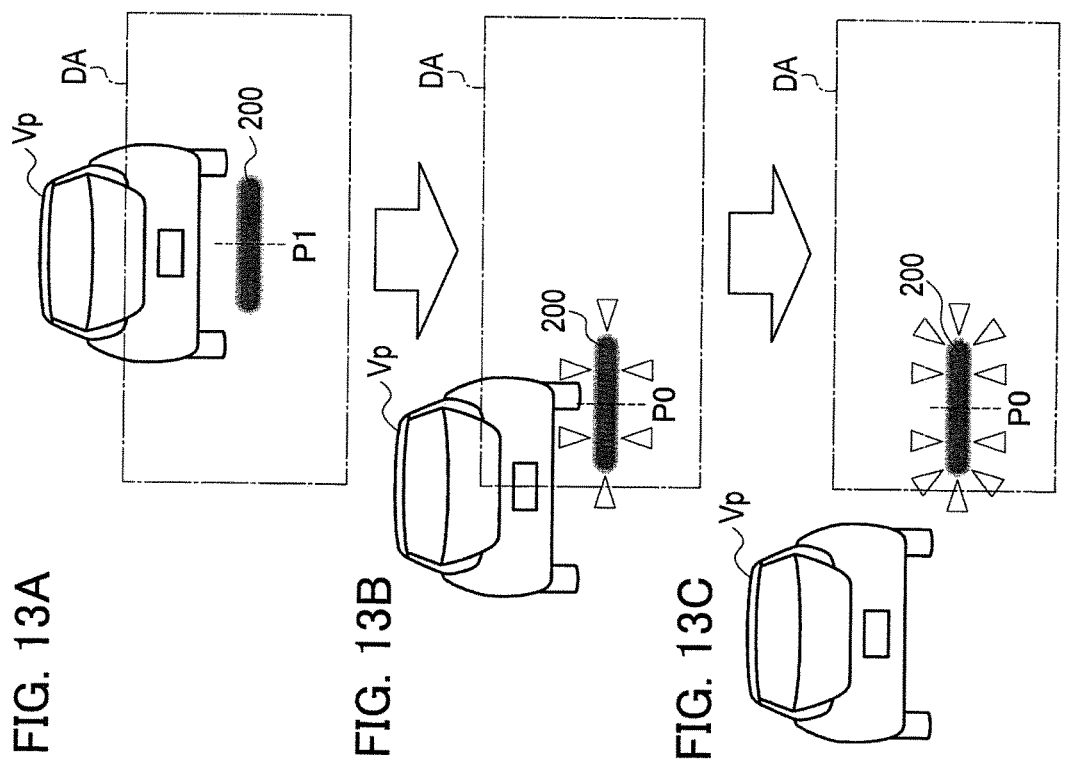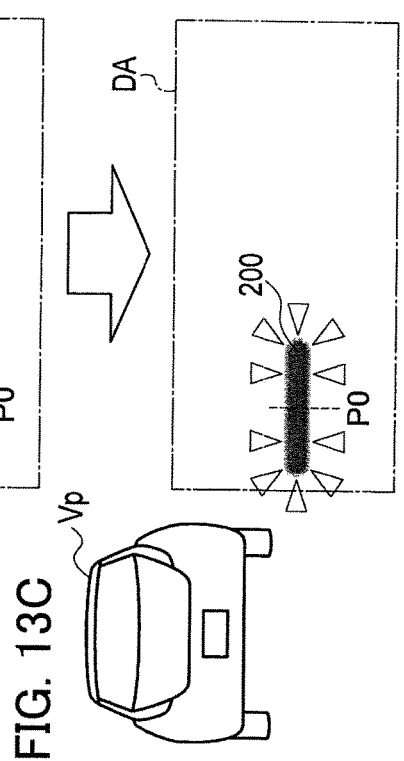

VEHICULAR DISPLAY DEVICE AND VEHICULAR DISPLAY METHOD

BACKGROUND

Technical Field

The present invention relates to a vehicular display device including a display such as a head-up display mounted in a vehicle and relates to a vehicular display method.

Related Art

In recent years, vehicles such as automobiles have begun to use a vehicular display device including a so-called head-up display displaying an image along with an object viewed by the driver through a windshield of a vehicle.

For example, there is proposed a vehicular display device which displays a marker image along with the position of a preceding vehicle for a certain time. The marker image indicates that the preceding vehicle is locked on by adaptive cruise control in which the speed of the vehicle and the inter-vehicle distance are automatically adjusted to follow the preceding vehicle (see Patent Literature 1).

CITATION LIST

Patent Literature

Patent Literature 1: Japanese Patent Application Publication No. 2005-067514

SUMMARY OF INVENTION

The marker image indicating that the preceding vehicle is locked on is displayed in a display area provided to overlap the position of the windshield. However, the display area has smaller width and height than an area of the windshield and is limited.

Accordingly, for example, when the followed preceding vehicle reaches a curved road, the preceding vehicle sometimes moves to the outer side of a left side edge (in the case of a left curve) or a right side edge (in the case of a right curve) of the display area. The adaptive cruise control is continued while the vehicle is traveling through such a curve.

However, since the display of the marker image disappears in the display area, it is difficult for the driver to determine whether the adaptive cruise control, specifically, control of the vehicle speed and the inter-vehicle distance for following the preceding vehicle is being performed or not.

One or more embodiments of the present invention provides a vehicular display device and a vehicular display method which allow a driver to easily recognize that control of following a preceding vehicle is being performed when the position of the preceding vehicle moves outside a side of the display area.

A vehicular display device according to one or more embodiments of the present invention includes a display configured to display an image in a display area provided to overlap a position of a windshield included in the vehicle. The vehicular display device includes a preceding vehicle detector configured to detect a position of a preceding vehicle which the vehicle is following while traveling; a display processor configured to cause the display to display a marker image corresponding to the detected position of the preceding vehicle; and a determiner configured to determine whether the preceding vehicle is located on an inner side of vehicle widthwise side edges of the display area or on outer sides of the vehicle widthwise side edges, based on the position of the preceding vehicle. When the preceding vehicle is located on the outer side of one of the vehicle widthwise side edges of the display area, the display processor continues to display the marker image in a peripheral portion of the vehicle widthwise side edge on the outer side of which the preceding vehicle is located.

BRIEF DESCRIPTION OF DRAWINGS

FIGS. 8A to 8E are views explaining a display example 5 of the marker image 200 by the vehicular display device 100.

FIGS. 9A to 9E are views explaining a display example 6 of the marker image 200 by the vehicular display device 100.

FIGS. 10A to 10E are views explaining a display example 7 of the marker image 200 by the vehicular display device 100.

FIGS. 11A to 11F are views explaining a display example 8 of the marker image 200 by the vehicular display device 100.

FIGS. 13A to 13E are views explaining a display example 10 of the marker image 200 by the vehicular display device 100.

DETAILED DESCRIPTION

Figure 1:
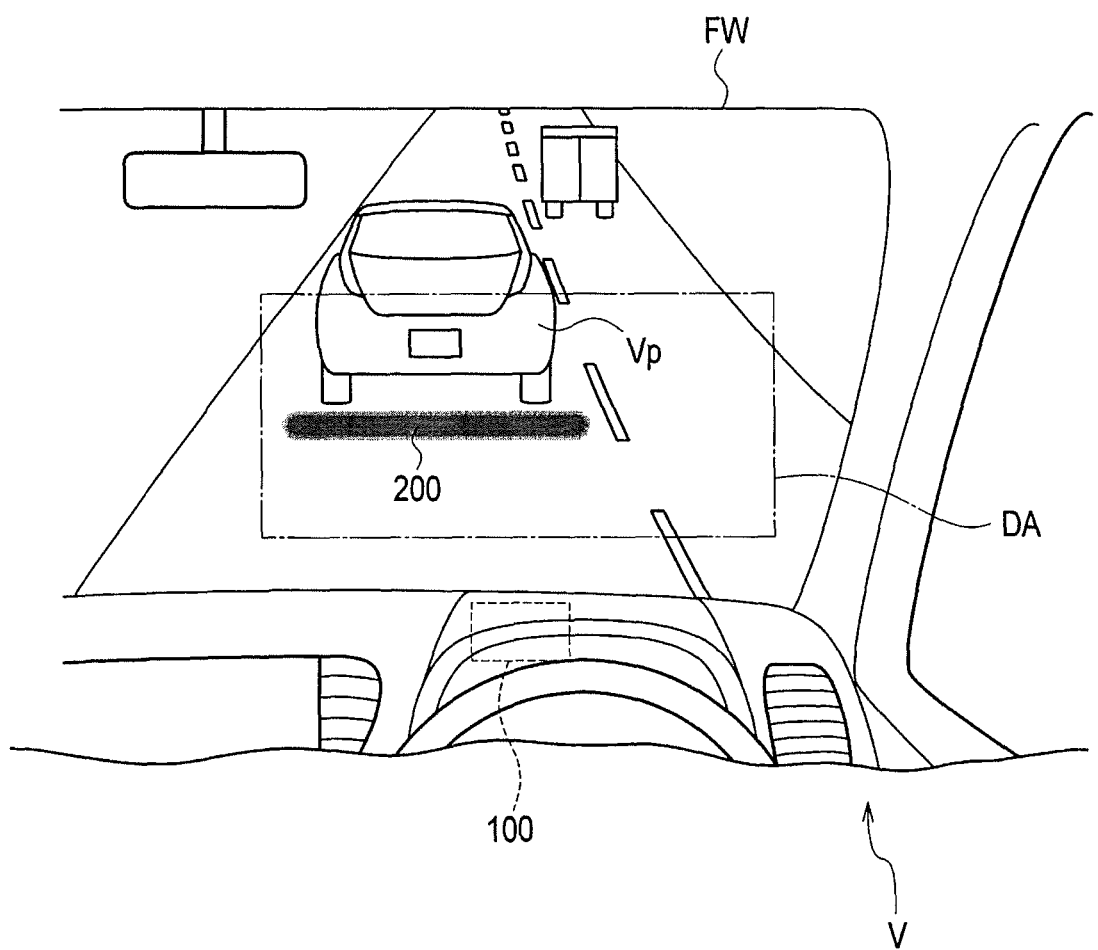
FIG. 1 is a schematic view of a vehicle V in which a vehicular display device 100 according to one or more embodiments of the present invention is mounted.

Embodiments are described below based on the drawings. Note that the same functions and configurations are denoted by the same or similar reference numerals and description thereof is omitted as appropriate. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Schematic Configuration of Vehicle in which Vehicular Display Device is Mounted]

FIG. 1 is a schematic view of a vehicle V in which a vehicular display device 100 according to one or more embodiments of the present invention is mounted. Specifically, FIG. 1 illustrates a view from a driver seat of the vehicle V.

As illustrated in FIG. 1, the vehicular display device 100 is mounted in the vehicle V. The vehicular display device 100 displays an image in a display area DA provided to overlap the position of the windshield FW included in the vehicle V.

Specifically, the vehicular display device 100 displays an image in the display area DA along with an object viewed by a driver through the windshield FW. More specifically, the vehicular display device 100 displays a marker image 200 in a manner superimposed on a preceding vehicle Vp in front of the vehicle V when the vehicle V is following the preceding vehicle Vp while traveling.

In other words, the vehicular display device 100 includes a head-up display (HUD). Particularly, the vehicular display device 100 functions as an augmented reality head-up display (AR-HUD) which can display a virtual symbol (image) along with the object viewed by the driver through the windshield FW.

The display area DA is provided to overlap a partial area of the windshield FW as viewed from the viewpoint of the driver seating on the driver seat. Although the specific position of the display area DA is not particularly limited, the display area DA is generally provided in a partial area of the windshield FW which includes the driver seat side.

Moreover, in one or more embodiments of the present invention, since the vehicular display device 100 displays the marker image 200 for the preceding vehicle Vp locked on by adaptive cruise control in the display area DA, the display area DA is provided in a lower portion of the windshield FW.

The adaptive cruise control is vehicle control of automatically adjusting the speed of the vehicle V and an inter-vehicle distance between the vehicle V and the preceding vehicle Vp to follow the preceding vehicle Vp, and is achieved by controlling an opening degree of an accelerator, a gear shift position, and a brake. However, the control of the gear shift position and the brake is not necessary.

The marker image 200 is a bar-shaped image displayed below a rear view of the preceding vehicle Vp and having a width similar to the entire width of the preceding vehicle Vp. Specifically, when the distance between the vehicle V and the preceding vehicle Vp increases, the size of the preceding vehicle Vp decreases and thus the width of the marker image 200 also decreases in synchronization with this decrease. On the other hand, when the distance between the vehicle V and the preceding vehicle Vp decreases, the size of the preceding vehicle Vp increases and thus the width of the marker image 200 also increases in synchronization with this increase.

However, as will be described later, the display mode of the marker image 200 is not limited to the mode illustrated in FIG. 1.

Note that, although the vehicle V in which the vehicular display device 100 is mounted is typically a four-wheel passenger vehicle (including an SUV and a minivan), the vehicle V may be a truck, a bus, or the like as a matter of course.

[Functional Block Configuration of Vehicular Display Device]

Figure 2:
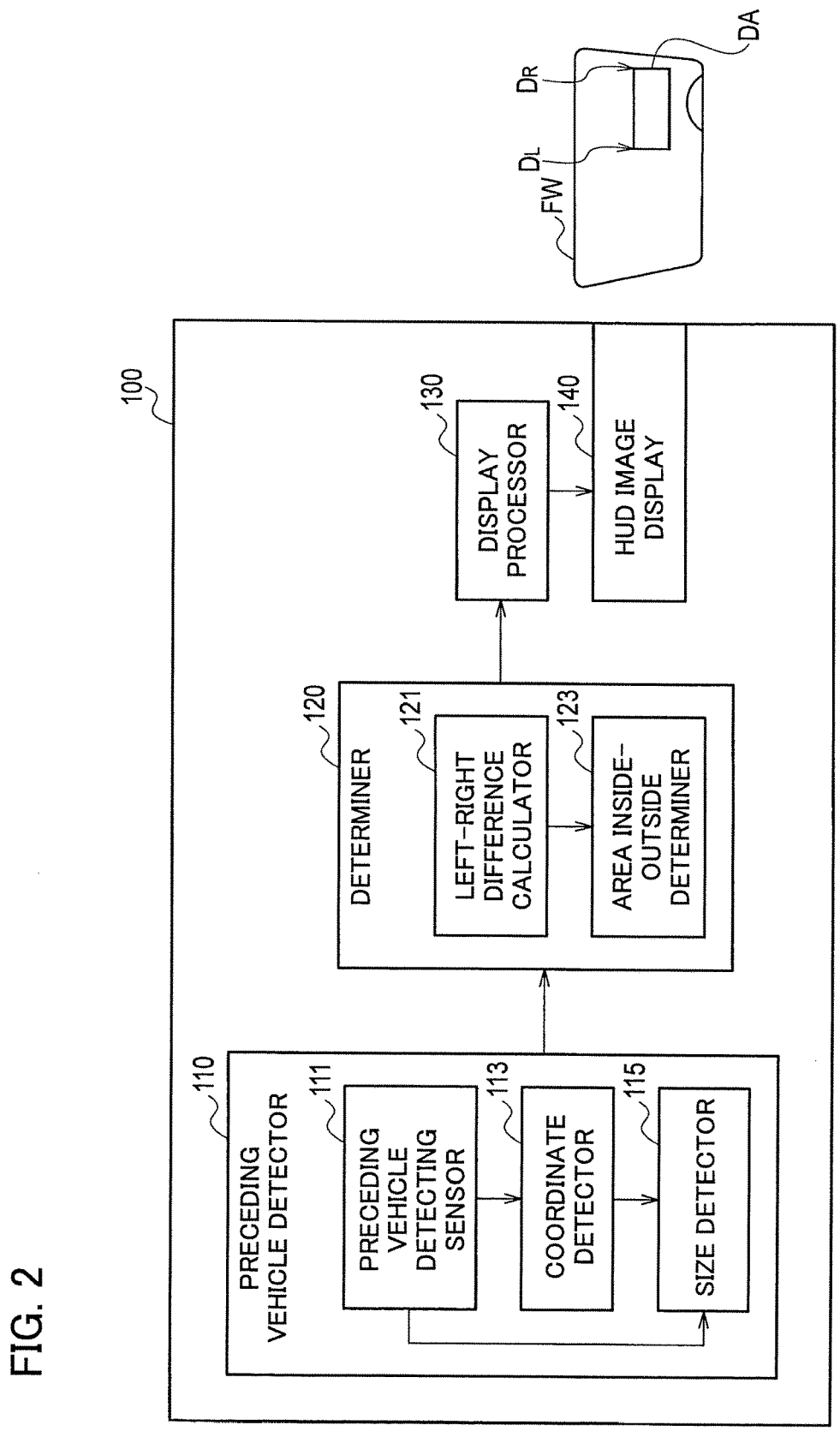
FIG. 2 is a functional block configuration diagram of the vehicular display device 100.

FIG. 2 is a functional block configuration diagram of the vehicular display device 100. As illustrated in FIG. 2, the vehicular display device 100 includes a preceding vehicle detector 110, a determiner 120, a display processor 130, and a HUD image display 140. Note that the functional blocks are configured by information processors such as a CPU and storage devices such as a memory and a hard disk drive.

The preceding vehicle detector 110 detects the position of the preceding vehicle Vp traveling in front of the vehicle V. Specifically, the preceding vehicle detector 110 is configured by a preceding vehicle detecting sensor 111, a coordinate detector 113, and a size detector 115.

The preceding vehicle detecting sensor 111 is configured by a sensor group which detects the preceding vehicle Vp. A camera configured to capture a front image in a traveling direction of the vehicle V including the preceding vehicle Vp and a radar configured to measure the distance to the preceding vehicle Vp are used as the sensor group.

Note that the camera may be a monocular camera or a stereo camera and is configured by an imaging element using a CCD, a CMOS, or the like. The radar may be a millimeter wave radar or a laser radar. Moreover, the preceding vehicle detecting sensor 111 may be configured only by the camera or the radar.

The coordinate detector 113 detects coordinate data of the preceding vehicle Vp in a three-dimensional space, based on the image of the preceding vehicle Vp and the distance to the preceding vehicle Vp which are detected by the preceding vehicle detecting sensor 111.

The size detector 115 detects the size of the preceding vehicle Vp viewed by the driver in the display area DA, based on the coordinate data of the preceding vehicle Vp detected by the coordinate detector 113.

The determiner 120 determines whether the preceding vehicle Vp is located in the display area DA or not, based on the position of the preceding vehicle Vp detected by the preceding vehicle detector 110. Specifically, the determiner 120 is configured by a left-right difference calculator 121 and an area inside-outside determiner 123.

The left-right difference calculator 121 calculates a left-right difference between the vehicle V (host vehicle) and the preceding vehicle Vp. Specifically, the left-right difference calculator 121 calculates a left-right difference between the host vehicle and the preceding vehicle Vp in the display area DA, based on the coordinate data and the size of the preceding vehicle Vp provided by the preceding vehicle detector 110.

The area inside-outside determiner 123 determines whether the preceding vehicle Vp is located between a left side edge $D_L$ and a right side edge $D_R$ of the display area DA, that is located on an inner side of vehicle widthwise side edges of the display area DA or located on outer sides of the vehicle widthwise side edges, based on a result of calculation by the left-right difference calculator 121.

Figure 4A:
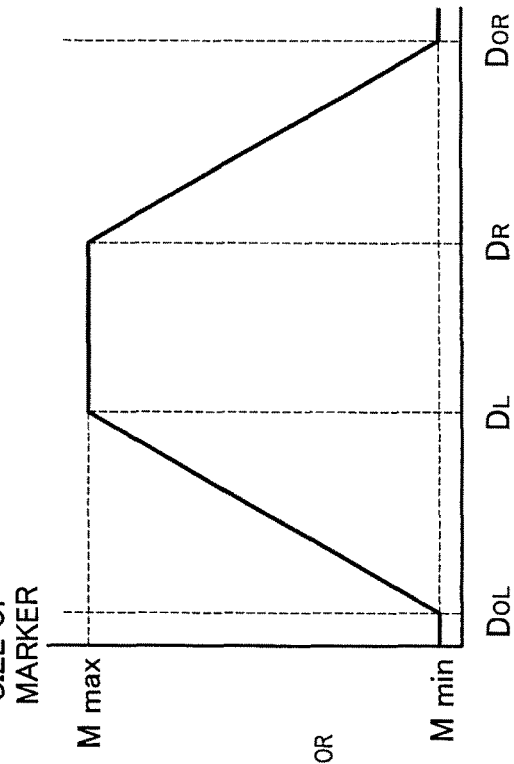
FIGS. 4A to 4D are views explaining a display example 1 of a marker image 200 by the vehicular display device 100.

Specifically, the area inside-outside determiner 123 can determine how much of the preceding vehicle Vp is located on the outer side (outer side $D_{OL}$ or outer side $D_{OR}$, not illustrated in FIG. 2, see FIG. 4A) of the side edge $D_L$ or the side edge $D_R$. For example, the width (ratio) of a portion of the preceding vehicle Vp outside the display area DA is determined based on the entire width of the rear view of the preceding vehicle Vp.

The display processor 130 displays the marker image 200 corresponding to the position of the preceding vehicle Vp detected by the preceding vehicle detector 110 on the HUD image display 140. Specifically, the display processor 130 displays the marker image 200 in the display area DA.

Particularly, when the determiner 120 determines that the preceding vehicle Vp is located on the outer side of one of the vehicle widthwise side edges (side edge $D_L$ or side edge $D_R$, same applies hereafter) of the display area DA, the display processor 130 continues to display the marker image 200 in a peripheral portion of the vehicle widthwise side edge on the outer side of which the preceding vehicle Vp is located. The "peripheral portion" refers to a position on the vehicle widthwise side edge on the outer side of which the preceding vehicle Vp is located or a portion near or around this position.

In other words, the display processor 130 continues to display the marker image 200 in the display area DA when the preceding vehicle Vp is located on the outer side of the display area DA, as long as the preceding vehicle Vp is locked on by the adaptive cruise control.

Specific display of the marker image 200 by the display processor 130 is described below.

First, when the preceding vehicle Vp is located in the display area DA, the display processor 130 displays the marker image 200 below the preceding vehicle Vp. When the preceding vehicle Vp is partially located on the outer side of the vehicle widthwise side edge of the display area DA, the display processor 130 can reduce the width of the marker image 200 depending on the width of a portion of the preceding vehicle Vp located in the display area DA.

Note that the width of the marker image 200 refers to the size of the marker image 200 in a horizontal direction (left-right direction) of the display area DA.

When the entire preceding vehicle Vp is located on the outer side of the vehicle widthwise side edge of the display area DA, the display processor 130 can display an icon 300 (not illustrated in FIG. 2, see FIG. 5C) indicating the preceding vehicle Vp adjacent to the marker image 200.

The display processor 130 can display the marker image 200 below the preceding vehicle Vp when the preceding vehicle Vp is located in the display area DA, and move the marker image 200 toward the side of the preceding vehicle Vp as the portion of the preceding vehicle Vp located on the outer side of the vehicle widthwise side edge of the display area DA increases.

Furthermore, the display processor 130 can reduce the size of the marker image 200 while moving the marker image 200 toward the side of the preceding vehicle Vp as the portion of the preceding vehicle Vp located on the outer side of the vehicle widthwise side edge of the display area DA increases.

The display processor 130 can display the marker image 200 shaped into an arc about a predetermined position in the preceding vehicle Vp, below the preceding vehicle Vp, when the preceding vehicle Vp is located in the display area DA.

Specifically, the display processor 130 displays the marker image 200 shaped into the arc about the center CT (not illustrated in FIG. 2, see FIG. 7A) of the rear view of the preceding vehicle Vp as the predetermined position. Note that the center CT of the rear view of the preceding vehicle Vp can be a point where a straight line connecting an upper left end and a lower right end of the preceding vehicle Vp intersects a straight line connecting an upper right end and a lower left end of the preceding vehicle Vp. However, the center CT does not have to be such a position.

The center CT may be a point where a straight line passing the center of the preceding vehicle Vp in the vehicle width direction intersects a straight line passing the center of the preceding vehicle Vp in a vehicle height direction. Moreover, the center CT may be slightly deviated from the aforementioned intersection points.

Moreover, the display processor 130 may reduce the length of the arc of the marker image 200 while turning the marker image 200 about the predetermined position in the preceding vehicle Vp to move the marker image 200 toward the side of the preceding vehicle Vp, as the portion of the preceding vehicle Vp located on the outer side of the vehicle widthwise side edge of the display area DA increases.

In this case, the display processor 130 may fix the length of the arc of the marker image 200 when the predetermined position in the preceding vehicle Vp is away from the side edge of the display area DA by a predetermined distance or more.

The display processor 130 can display the marker image 200 with a predetermined width below the preceding vehicle Vp when the preceding vehicle Vp is located in the display area DA, and continue to display the marker image 200 with the predetermined width when the preceding vehicle Vp is located on the outer side of the side edge of the display area DA.

Note that, as described above, the width of the marker image 200 is the size of the marker image 200 in the horizontal direction (left-right direction) of the display area DA and, although not particularly limited, the predetermined width may be similar to the entire width of the preceding vehicle Vp in a lower portion of the rear view of the preceding vehicle Vp.

The display processor 130 can change the color of the marker image 200 as the portion of the preceding vehicle Vp located on the outer side of the vehicle widthwise side edge of the display area DA increases.

Specifically, the display processor 130 displays the marker image 200 in a first color (for example, green) when the preceding vehicle Vp is located in the display area DA. Meanwhile, the display processor 130 displays the marker image 200 in a second color (for example, blue) different from the first color when the preceding vehicle Vp is partially located on the outer side of the vehicle widthwise side edge of the display area DA. Furthermore, the display processor 130 displays the marker image 200 in a third color (for example, orange) different from the first and second colors when the entire preceding vehicle Vp is located on the outer side of the side edge of the display area DA.

Moreover, the display processor 130 may reduce the thickness of the marker image 200 as the portion of the preceding vehicle Vp located on the outer side of the vehicle widthwise side edge of the display area DA increases. The thickness of the marker image 200 refers to the size of the marker image 200 in a direction orthogonal to the width.

The display processor 130 can change the spatial frequency of the marker image 200 as the portion of the preceding vehicle Vp located on the outer side of the vehicle widthwise side edge of the display area DA increases. The spatial frequency of the marker image 200 means the number of lines included in a unit length. When the spatial frequency is low, the image is dull and when the spatial frequency is high, the image is sharp.

The display processor 130 can change the temporal frequency of the marker image 200 as the portion of the preceding vehicle Vp located on the outer side of the vehicle widthwise side edge of the display area DA increases. The temporal frequency of the marker image 200 means the frequency of displaying the image. When the temporal frequency is low, the image blinks slowly and when the temporal frequency is high, the image blinks rapidly or is constantly displayed.

Specific display examples of the marker image 200 in the aforementioned display processor 130 are further described later.

The HUD image display 140 is a head-up display (HUD) which displays images in the display area DA. In one or more embodiments of the present invention, the HUD image display 140 is configures a display.

As described above, the HUD image display 140 is the augmented reality head-up display (AR-HUD) which can display the virtual symbols (marker image 200 and the like) along with the objects viewed by the driver through the windshield FW.

In one or more embodiments of the present invention, the HUD image display 140 displays a desired image on a liquid crystal display or the like and reflects this image by using a mirror to display the image on the windshield FW as a virtual image.

[Operation of Vehicular Display Device]

Figure 3:
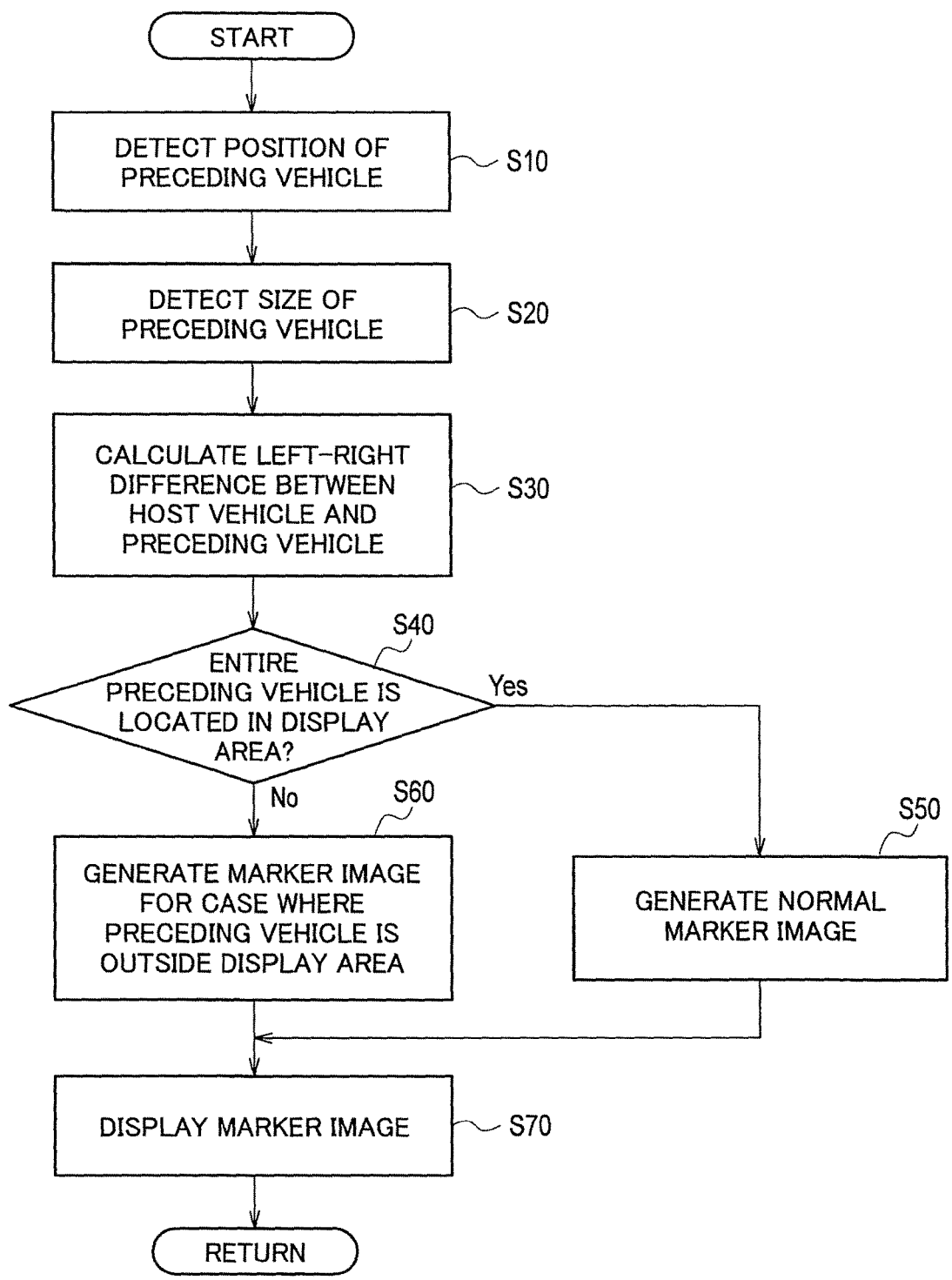
FIG. 3 is a diagram illustrating a marker image display operation flow of the vehicular display device 100.

FIG. 3 illustrates a marker image display operation flow of the vehicular display device 100. As illustrated in FIG. 3, the vehicular display device 100 detects the position of the preceding vehicle Vp (S10). Moreover, the vehicular display device 100 detects the size of the preceding vehicle Vp (S20). Note that this description is based on the premise that the preceding vehicle Vp is locked on by the adaptive cruise control.

Specifically, the vehicular display device 100 detects the coordinate data of the preceding vehicle Vp and detects the size of the preceding vehicle Vp viewed by the driver in the display area DA.

The vehicular display device 100 calculates the left-right difference between the host vehicle and the preceding vehicle Vp, based on the detected position and size of the preceding vehicle Vp (S30).

Specifically, the vehicular display device 100 calculates the left-right difference between the host vehicle and the preceding vehicle Vp in the display area DA.

The vehicular display device 100 determines whether the entire preceding vehicle Vp is located in the display area DA, based on the calculated left-right difference (S40).

Specifically, the vehicular display device 100 determines whether the entire rear view of the preceding vehicle Vp in the width direction is located in the display area DA.

When the entire preceding vehicle Vp is located in the display area DA, the vehicular display device 100 generates a normal marker image 200 (S50). Meanwhile, when the preceding vehicle Vp is located partially or entirely outside the display area DA, the vehicular display device 100 generates the marker image 200 for the case where the preceding vehicle Vp is located partially or entirely outside the display area DA (S60).

The vehicular display device 100 displays the generated marker image 200 in the display area DA by using the head-up display (HUD) (S70). Specifically, the vehicular display device 100 displays the normal marker image 200 or the marker image 200 for the case where the preceding vehicle Vp is located partially or entirely outside the display area DA.

[Examples of Image Display by Vehicular Display Device]

Next, display examples of the marker image 200 by the vehicular display device 100 are described with reference to FIGS. 4A to 13E.

(1) Display Example 1

FIGS. 4A to 4D are views explaining a display example 1 of the marker image 200 by the vehicular display device 100.

FIG. 4A illustrates a display example of the marker image 200 in the case where the preceding vehicle Vp is located in the display area DA. FIG. 4B illustrates a display example of the marker image 200 in the case where the preceding vehicle Vp is partially located outside the display area DA. FIG. 4C illustrates a display example of the marker image 200 in the case where the entire preceding vehicle Vp is located outside the display area DA.

Note that "the preceding vehicle Vp is located in the display area DA" means the position in the width direction of the preceding vehicle Vp, that is the position in the horizontal direction of the display area DA as illustrated in FIG. 4A.

By contrast, the preceding vehicle Vp is generally partially located outside the display area DA in a vertical direction of the display area DA as illustrated in FIG. 4A. Whether such a positional relationship is established or not depends on the size of the display area DA in the vertical direction and on the position of the viewpoint of the driver which varies depending on the type (passenger car, SUV/minivan, or truck/bus) of the vehicle V, as a matter of course.

As illustrated in FIG. 4A, when the preceding vehicle Vp is located in the display area DA (between the side edge $D_L$ and the side edge $D_R$), the vehicular display device 100 displays the marker image 200 below the preceding vehicle Vp.

Meanwhile, as illustrated in FIG. 4B, when the preceding vehicle Vp is partially located on the outer side $D_{OL}$ of the side edge $D_L$ of the display area DA, the vehicular display device 100 reduces the width of the marker image 200 depending on the width of the portion of the preceding vehicle Vp located in the display area DA.

Specifically, the vehicular display device 100 displays the marker image 200 with the same width as the width of the portion of the preceding vehicle Vp located in the display area DA.

Moreover, as illustrated in FIG. 4C, when the entire preceding vehicle Vp is located on the outer side $D_{OL}$ of the display area DA, the vehicular display device 100 does not stop the display of the marker image 200 and continues to display it. Although a circular dot shaped marker image 200 is displayed in the example illustrated in FIG. 4C, the shape of the marker image 200 may be a different one.

Moreover, although the case where the preceding vehicle Vp moves toward the outer side $D_{OL}$ of the display area DA is illustrated in FIGS. 4A to 4C, similar processing is executed on the side edge $D_R$ side also in the case where the preceding vehicle Vp moves toward the outer side $D_{OR}$ of the right side edge $D_R$ of the display area DA (the same applies hereafter).

Figure 4D:
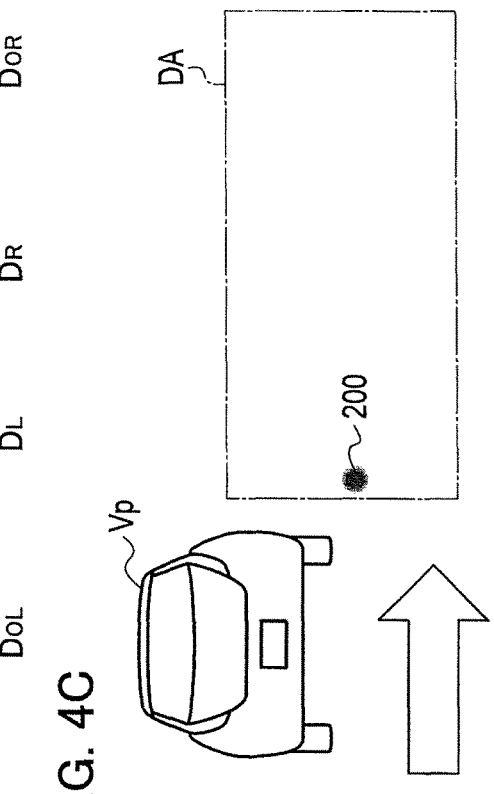
Figure 4B:
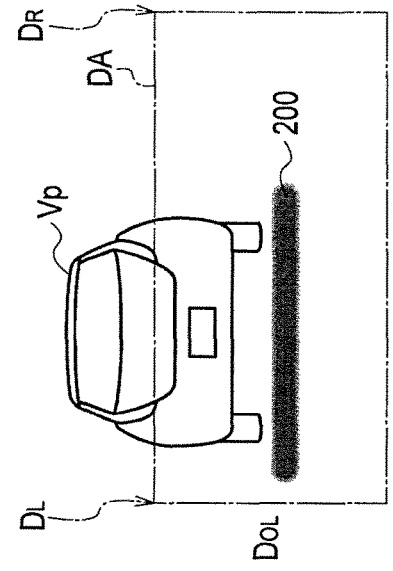
Figure 4C:
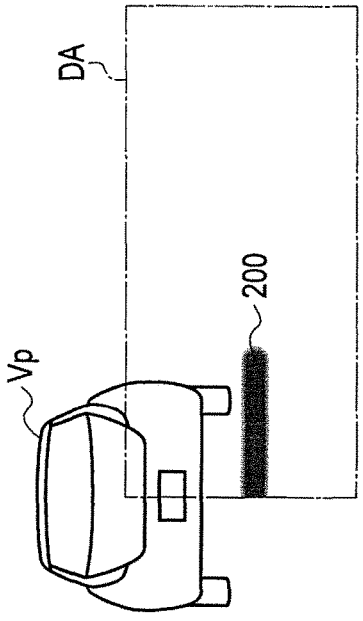

FIG. 4D illustrates a relationship between the position of the preceding vehicle Vp and the size (M) of the marker image 200. As illustrated in FIG. 4D, the size (width) of the marker image 200 decreases as the portion of the preceding vehicle Vp outside the side edge $D_L$ or the side edge $D_R$ increases. Moreover, the marker image 200 continues to be displayed at the minimum size when the entire preceding vehicle Vp is located on the outer side $D_{OL}$ or the outer side $D_{OR}$.

(2) Display Example 2

Figure 5A:
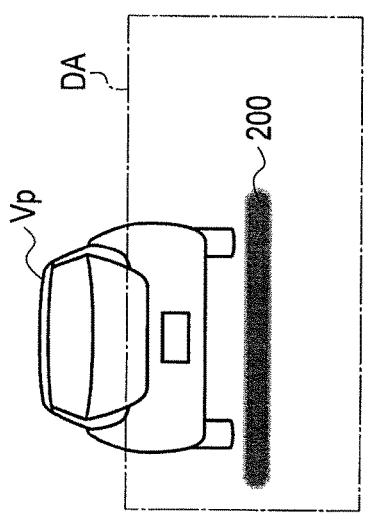
FIGS. 5A to 5C are views explaining a display example 2 of the marker image 200 by the vehicular display device 100.
Figure 5C:
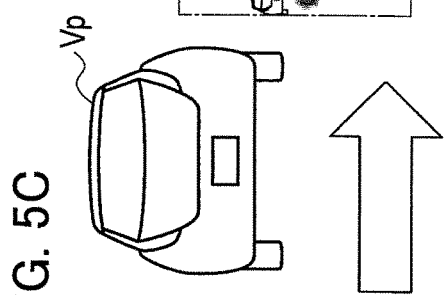
Figure 5B:
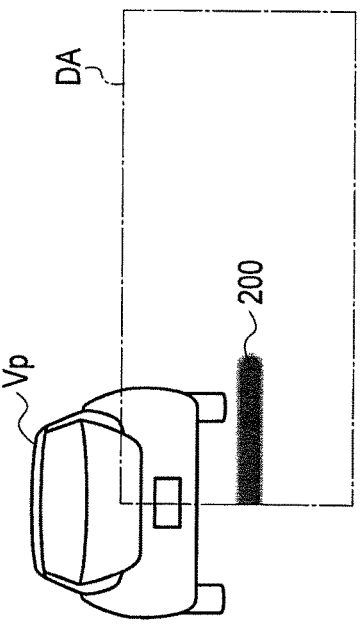

FIGS. 5A to 5C are views explaining a display example 2 of the marker image 200 by the vehicular display device 100. Portions different from those in the aforementioned display example 1 are mainly described below. Moreover, illustration of the side edge $D_L$, the side edge $D_R$, the outer side $D_{OL}$, and the outer side $D_{OR}$ is omitted as appropriate.

FIGS. 5A and 5B are similar to FIGS. 4A and 4B described in the display example 1. FIG. 5C is also similar to FIG. 4C described in the display example 1 but the icon 300 is displayed together with the marker image 200.

The icon 300 is an image indicating the preceding vehicle Vp. The vehicular display device 100 displays the icon 300 adjacent to the marker image 200. In the display example 2, an image modeled after the rear view of the preceding vehicle Vp is used as the icon 300.

In other words, the vehicular display device 100 displays the icon 300 indicating the preceding vehicle Vp adjacent to the marker image 200 when the entire preceding vehicle Vp is located on the outer side of the side edge of the display area DA.

The icon 300 is not limited to the aforementioned image, and a different image may be used as long as the driver can easily recognize that the image indicates the preceding vehicle Vp. For example, the vehicular display device 100 may detect the type (SUV/minivan, truck/bus, or the like) of the preceding vehicle Vp and display the icon 300 indicating the rear view of the vehicle specified in advance depending on the detected type.

(3) Display Example 3

FIGS. 6A to 6D are views explaining a display example 3 of the marker image 200 by the vehicular display device 100.

Figure 6A:
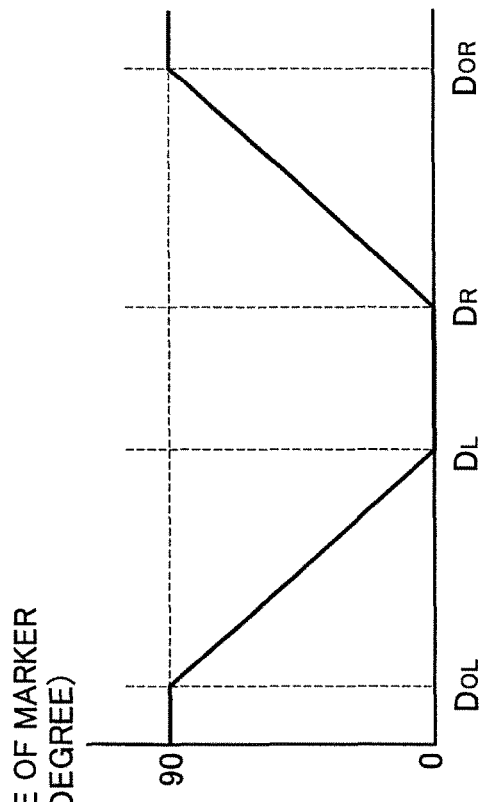
FIGS. 6A to 6D are views explaining a display example 3 of the marker image 200 by the vehicular display device 100.

FIG. 6A illustrates a display example of the marker image 200 in the case where the preceding vehicle Vp is located in the display area DA. FIG. 6B illustrates a display example of the marker image 200 in the case where the preceding vehicle Vp is partially located outside the display area DA. FIG. 6C illustrates a display example of the marker image 200 in the case where the entire preceding vehicle Vp is located outside the display area DA.

As illustrated in FIG. 6A, when the preceding vehicle Vp is located in the display area DA, the vehicular display device 100 displays the marker image 200 below the preceding vehicle Vp. Note that, in the display example 3, a crescent-shaped marker image 200 is displayed.

As illustrated in FIGS. 6B and 6C, the vehicular display device 100 moves the marker image 200 toward the side of the preceding vehicle Vp as the portion of the preceding vehicle Vp located on the outer side $D_{OL}$ of the side edge $D_L$ of the display area DA increases.

Specifically, the vehicular display device 100 turns the crescent-shaped marker image 200 and gradually moves the marker image 200 from a position below the preceding vehicle Vp to a position on the side of the preceding vehicle Vp, as the preceding vehicle Vp moves outside the display area DA.

As illustrated in FIG. 6C, when the entire preceding vehicle Vp is located on the outer side $D_{OL}$ of the display area DA, the marker image 200 is displayed on the right side of the preceding vehicle Vp while being turned by about 90 degrees from the position in FIG. 6A. Note that, when the entire preceding vehicle Vp is located on the outer side $D_{OR}$ of the display area DA, the marker image 200 is displayed on the left side of the preceding vehicle Vp.

Figure 6D:
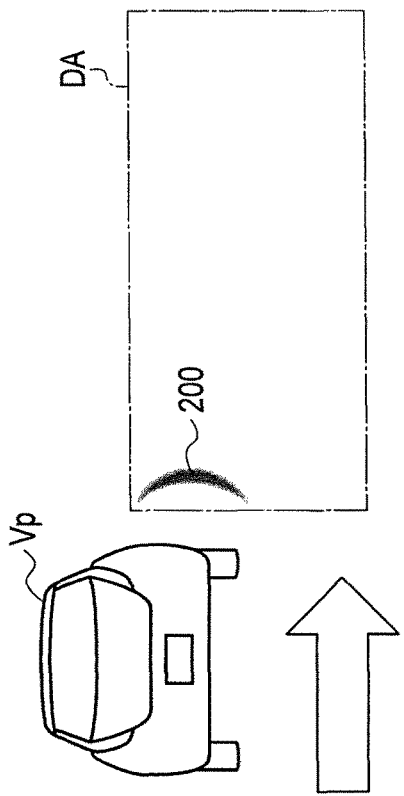
Figure 6B:
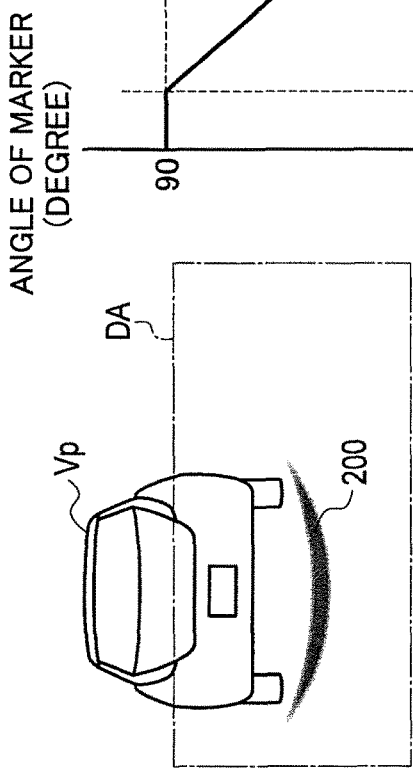
Figure 6C:
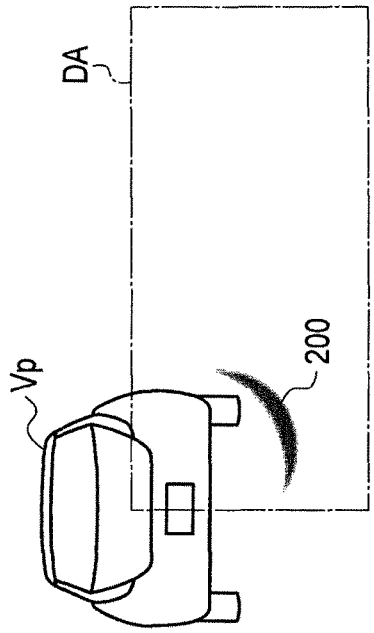

FIG. 6D illustrates a relationship between the position of the preceding vehicle Vp and the angle of the marker image 200. As illustrated in FIG. 6D, as the portion of the preceding vehicle Vp outside the side edge $D_L$ or the side edge $D_R$ increases. the angle of the marker image 200 increases. In FIG. 6D, the horizontal direction is 0 degrees and the perpendicular direction is 90 degrees.

Although the crescent-shaped marker image 200 is used in the display example 3, the marker image 200 does not have to have a crescent shape and may have, for example, a bar shape as illustrated in the display example 1.

Moreover, in the display example 3, the vehicular display device 100 reduces the size of the marker image 200 while moving the marker image 200 toward the side of the preceding vehicle Vp, as the portion of the preceding vehicle Vp located on the outer side $D_{OL}$ of the side edge $D_L$ of the display area DA increases. However, such size change is not necessary.

(4) Display Example 4

FIGS. 7A to 7E are views explaining a display example 4 of the marker image 200 by the vehicular display device 100.

Figure 7A:
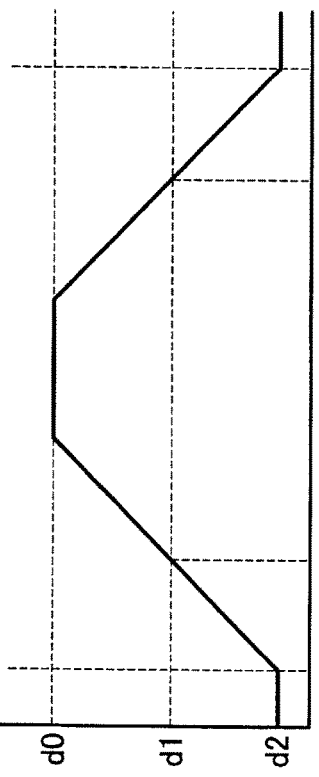
FIGS. 7A to 7E are views explaining a display example 4 of the marker image 200 by the vehicular display device 100.

FIG. 7A illustrates a display example of the marker image 200 in the case where the preceding vehicle Vp is located in the display area DA. FIG. 7B illustrates a display example of the marker image 200 in the case where the preceding vehicle Vp is partially located outside the display area DA. FIGS. 7C and 7D illustrate display examples of the marker image 200 in the case where the entire preceding vehicle Vp is located outside the display area DA.

As illustrated in FIG. 7A, when the preceding vehicle Vp is located in the display area DA, the vehicular display device 100 displays the marker image 200 shaped into an arc about a predetermined position in the preceding vehicle Vp, below the preceding vehicle Vp.

Specifically, the vehicular display device 100 displays the marker image 200 shaped into an arc about the center CT. As illustrated in FIG. 7A, when the preceding vehicle Vp is located in the display area DA, the angle formed by normals connecting the center CT and both ends of the marker image 200 is d0. In the display example 4, d0 is larger than the right angle.

As illustrated in FIGS. 7B and 7C, the vehicular display device 100 reduces the length of the arc of the marker image 200 while turning the marker image 200 about the center CT (predetermined position) to move the marker image 200 toward the side of the preceding vehicle Vp, as the portion of the preceding vehicle Vp located on the outer side $D_{OL}$ of the side edge $D_L$ of the display area DA increases.

Specifically, the vehicular display device 100 turns the marker image 200 shaped into the arc about the center CT to move the marker image 200 to the side of the preceding vehicle Vp.

Simultaneously, the vehicular display device 100 reduces the length of the arc of the marker image 200 from that in the case where the preceding vehicle Vp is located in the display area DA. More specifically, the vehicular display device 100 sets the angle between the normals connecting the center CT and the both ends of the marker image 200 to d1 smaller than d0.

Note that, in the display example 4, the length of the arc of the marker image 200 refers to the length from one end to the other end of the arc-shaped marker image 200.

As illustrated in FIG. 7C, when the entire preceding vehicle Vp is located on the outer side $D_{OL}$ of the display area DA, the vehicular display device 100 further reduces the length of the marker image 200. More specifically, the vehicular display device 100 sets the angle between the normals connecting the center CT and the both ends of the marker image 200 to d2 smaller than d1.

Moreover, as illustrated in FIG. 7D, the vehicular display device 100 fixes the length of the arc of the marker image 200 when the center CT of the preceding vehicle Vp is away from the side edge $D_L$ of the display area DA by a predetermined distance X or more.

Specifically, when the center CT of the preceding vehicle Vp is away from the side edge $D_L$ by the distance X or more, the vehicular display device 100 sets the angle between the normals connecting the center CT and the both ends of the marker image 200 to d2 as in the state illustrated in FIG. 7C and fixes the length of the arc of the marker image 200.

In the example illustrated in FIG. 7D, although the center CT of the preceding vehicle Vp is away from the side edge $D_L$ by the distance X or more, the marker image 200 shaped into an arc about a virtual center CT' is displayed as in the state illustrated in FIG. 7C. In other words, in the display example 4, the marker image 200 illustrated in FIG. 7C and the marker image 200 illustrated in FIG. 7D have the same size and are displayed at the same position.

Note that, as described above, the center CT does not have to be the center CT of the preceding vehicle Vp and can be slightly deviated therefrom.

Figure 7E:
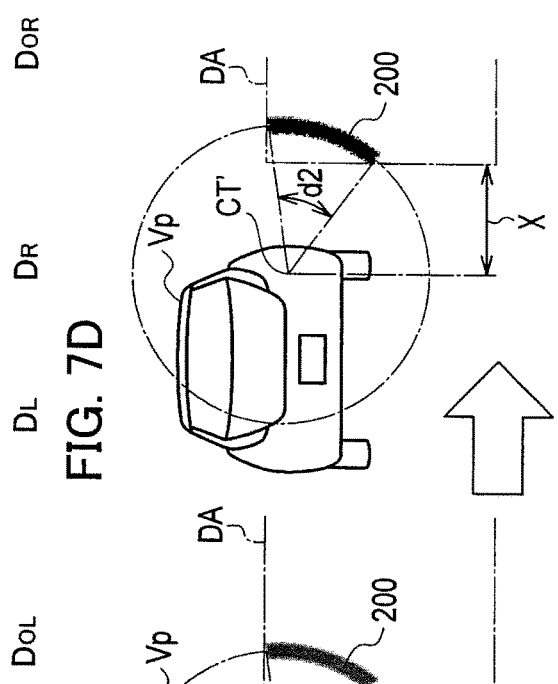
Figure 7B:
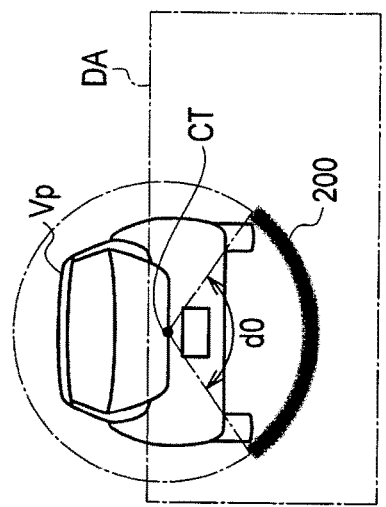
Figure 7C:
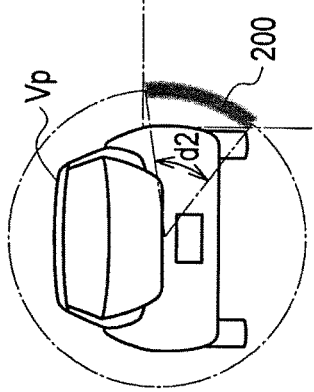
Figure 7D:
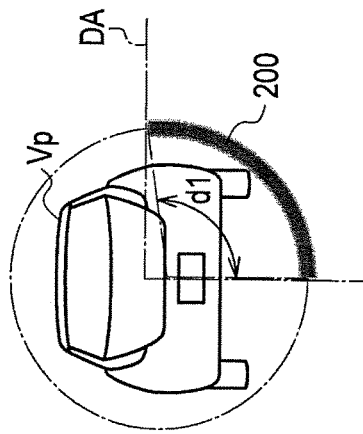

FIG. 7E illustrates a relationship between the position of the preceding vehicle Vp and the angle of the marker image 200. As illustrated in FIG. 7E, as the portion of the preceding vehicle Vp outside the side edge $D_L$ or the side edge $D_R$ increases, the display angle (d0 to d2) of the marker image 200 becomes smaller. The length of the arc-shaped marker image 200 thereby becomes smaller. However, when the entire preceding vehicle Vp is located on the outer side $D_{OL}$ or the outer side $D_{OR}$, that is when the center CT of the preceding vehicle Vp is away from the side edge $D_L$ by the distance X or more, the length of the arc of the marker image 200 is not reduced further and is fixed.

(5) Display Example 5

FIGS. 8A to 8E are views explaining a display example 5 of the marker image 200 by the vehicular display device 100. Although the display example 5 corresponds to the display example 1, the width (size) of the marker image 200 is fixed.

FIG. 8A illustrates a display example of the marker image 200 in the case where the preceding vehicle Vp is located in the display area DA. FIG. 8B illustrates a display example of the marker image 200 in the case where the preceding vehicle Vp is partially located outside the display area DA. FIG. 8C illustrates a display example of the marker image 200 in the case where the entire preceding vehicle Vp is located outside the display area DA.

As illustrated in FIG. 8A, when the preceding vehicle Vp is located in the display area DA, the vehicular display device 100 displays the marker image 200 with a predetermined width below the preceding vehicle Vp. Moreover, the center P1 of the marker image 200 in the width direction matches the center of the preceding vehicle Vp in the width direction.

As illustrated in FIGS. 8B and 8C, when the preceding vehicle Vp is located on the outer side $D_{OL}$ of the side edge $D_L$ of the display area DA, the vehicular display device 100 continues to display the marker image 200 with the predetermined width. Specifically, the width of the marker image 200 is the same in all of the cases where (i) the entire preceding vehicle Vp is located in the display area DA, (ii) the preceding vehicle Vp is partially located on the outer side $D_{OL}$ of the display area DA, and (iii) the entire preceding vehicle VP is located on the outer side $D_{OL}$ of the display area DA.

Accordingly, the center P0 of the marker image 200 in the width direction in the cases of (ii) and (iii) does not match the center of the preceding vehicle Vp in the width direction.

FIG. 8D illustrates a relationship between the position of the preceding vehicle Vp and the size (M) of the marker image 200. As illustrated in FIG. 8D, the size (M) of the marker image 200 is fixed irrespective of the position of the preceding vehicle Vp. Note that, in FIG. 8D, the relationship between the position of the preceding vehicle Vp and the size (M) of the marker image 200 in the display example 1 illustrated in FIG. 4D is illustrated by the dotted line.

FIG. 8E illustrates a relationship between the position of the preceding vehicle Vp and the center (P0, P1) of the marker image 200. As illustrated in FIG. 8E, the center of the marker image 200 is moved toward the side edge $D_L$ (or side edge $D_R$) depending on the position of the preceding vehicle Vp. When the center of the marker image 200 reaches the position P0, the marker image 200 is not moved further and is maintained at the position P0 even if the position of the preceding vehicle Vp moves further to the outer side $D_{OL}$ (or outside $D_{OR}$).

(6) Display Example 6

FIGS. 9A to 9E are views explaining a display example 6 of the marker image 200 by the vehicular display device 100. The display example 6 is substantially the same as the display example 5 but is different from the display example 5 in that the thickness of the marker image 200 is reduced.

FIGS. 9A to 9D correspond to FIGS. 8A to 8C and 8E, respectively. In the display example 6, the vehicular display device 100 reduces the thickness (S0, S1) of the marker image 200 as the portion of the preceding vehicle Vp located on the outer side $D_{OL}$ of the side edge $D_L$ of the display area DA increases.

FIG. 9E illustrates a relationship between the position of the preceding vehicle Vp and the thickness (S0, S1) of the marker image 200. As illustrated in FIG. 9E, the thickness of the marker image 200 is reduced as the portion of the preceding vehicle Vp outside the side edge $D_L$ or the side edge $D_R$ increases. Moreover, the marker image 200 with the minimum thickness (S0) continues to be displayed when the entire preceding vehicle VP is located on the outer side $D_{OL}$ or the outer side $D_{OR}$.

(7) Display Example 7

FIGS. 10A to 10E are views explaining a display example 7 of the marker image 200 by the vehicular display device 100. The display example 7 is also substantially the same as the display example 5 but is different from the display example 5 in that the color of the marker image 200 is changed.

FIGS. 10A to 10E correspond to FIGS. 8A to 8E, respectively. In the display example 7, the vehicular display device 100 changes the color of the marker image 200 as the portion of the preceding vehicle Vp located on the outer side $D_{OL}$ of the side edge $D_L$ of the display area DA increases.

Specifically, the vehicular display device 100 displays the marker image 200 in a first color when the preceding vehicle Vp is located in the display area DA. In the display example 7, the marker image 200 is displayed in green (GR).

The vehicular display device 100 displays the marker image 200 in a second color different from the first color when the preceding vehicle Vp is partially located on the outer side $D_{OL}$ of the side edge $D_L$ of the display area DA. In the display example 7, the marker image 200 is displayed in blue (BL).

Moreover, the vehicular display device 100 displays the marker image 200 in a third color different from the first and second colors when the entire preceding vehicle Vp is located on the outer side $D_{OL}$ of the side edge $D_L$ of the display area DA. In the display example 7, the marker image 200 is displayed in orange (OR).

FIG. 10E illustrates a relationship between the position of the preceding vehicle Vp and the color (GR, BL, OR) of the marker image 200. As illustrated in FIG. 10E, the color of the marker image 200 changes from green to blue and then to orange as the portion of the preceding vehicle Vp outside the side edge $D_L$ or the side edge $D_R$ increases.

Note that, although the color of the marker image 200 instantaneously changes from green to blue and then to orange in the display example 7 as illustrated in FIG. 10E, the color of the marker image 200 may change gradually from green to blue and then to orange.

(8) Display Example 8

FIGS. 11A to 11F are views explaining a display example 8 of the marker image 200 by the vehicular display device 100. The display example 8 is a display example in which the display example 6 and the display example 7 described above are combined.

FIGS. 11A to 11E correspond to FIGS. 10A to 10E, respectively.

In the display example 8, as illustrated in FIG. 11F, the vehicular display device 100 reduces the thickness (S0, S1) of the marker image 200 as the portion of the preceding vehicle Vp located on the outer side $D_{OL}$ of the side edge $D_L$ of the display area DA increases.

(9) Display Example 9

FIGS. 12A to 12E are views explaining a display example 9 of the marker image 200 by the vehicular display device 100. The display example 9 is also substantially the same as the display example 5 but is different from the display example 5 in that the spatial frequency of the marker image 200 is changed.

FIGS. 12A to 12D correspond to FIGS. 8A to 8C and 8E, respectively.

Specifically, the vehicular display device 100 changes the spatial frequency of the marker image 200 as the portion of the preceding vehicle Vp located on the outer side $D_{OL}$ of the side edge $D_L$ of the display area DA increases. More specifically, the vehicular display device 100 reduces the spatial frequency (F0, F1) of the marker image 200 as the portion of the preceding vehicle Vp located on the outer side $D_{OL}$ of the side edge $D_L$ of the display area DA increases.

The marker image 200 is thereby displayed to become duller as the portion of the preceding vehicle Vp located on the outer side $D_{OL}$ of the side edge $D_L$ of the display area DA increases.

Figures 12A, 12B, 12C, 12D, 12E:
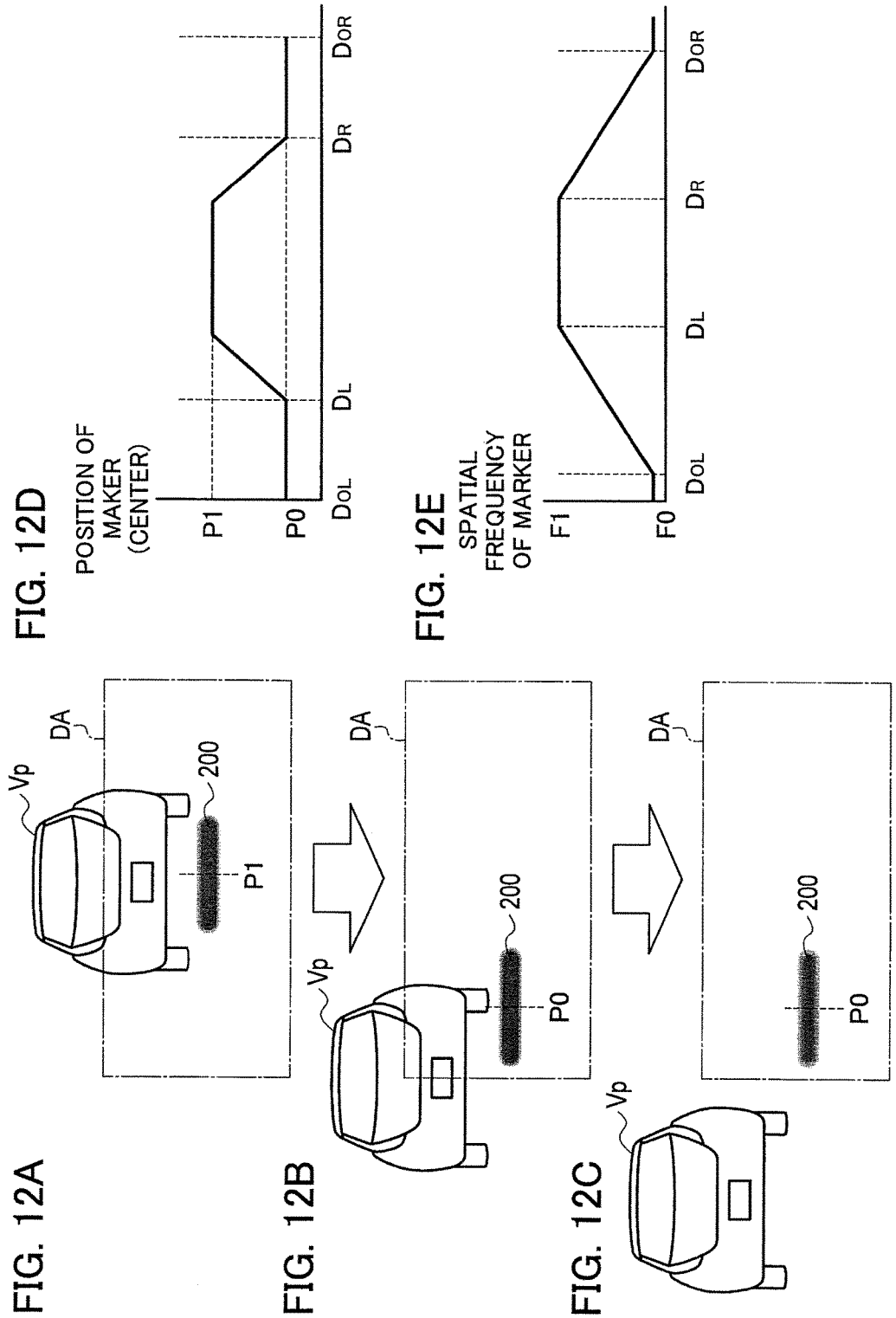
FIGS. 12A to 12E are views explaining a display example 9 of the marker image 200 by the vehicular display device 100.

FIG. 12E illustrates a relationship between the position of the preceding vehicle Vp and the spatial frequency (F0, F1) of the marker image 200. As illustrated in FIG. 12E, the spatial frequency of the marker image 200 becomes lower as the portion of the preceding vehicle Vp outside the side edge $D_L$ or the side edge $D_R$ increases.

(4) Display Example 10

FIGS. 13A to 13E are views explaining a display example 10 of the marker image 200 by the vehicular display device 100. The display example 10 is also substantially the same as the display example 5 but is different from the display example 5 in that the temporal frequency of the marker image 200 is changed.

FIGS. 13A to 13D correspond to FIGS. 8A to 8C and 8E, respectively.

Specifically, the vehicular display device 100 changes the temporal frequency of the marker image 200 as the portion of the preceding vehicle Vp located on the outer side $D_{OL}$ of the side edge $D_L$ of the display area DA increases. More specifically, the vehicular display device 100 increases the temporal frequency (F0, F1) of the marker image 200 as the portion of the preceding vehicle Vp located on the outer side $D_{OL}$ of the side edge $D_L$ of the display area DA increases.

The marker image 200 is thereby displayed to blink at shorter intervals as the portion of the preceding vehicle Vp located on the outer side $D_{OL}$ of the side edge $D_L$ of the display area DA increases.

FIG. 13E illustrates a relationship between the position of the preceding vehicle Vp and the temporal frequency (F0, F1) of the marker image 200. As illustrated in FIG. 13E, the temporal frequency of the marker image 200 becomes higher as the portion of the preceding vehicle Vp outside the side edge $D_L$ or the side edge $D_R$ increases.

The following operations and one or more of the following effects can be obtained from one or more of the aforementioned embodiments.

When the preceding vehicle Vp is located on the outer side (outside $D_{OL}$ or outside $D_{OR}$, same applies hereafter) of one of the vehicle widthwise side edges (side edge $D_L$ or side edge $D_R$, same applies hereafter) of the display area DA, the vehicular display device 100 continues to display the marker image 200 in the peripheral portion of the vehicle widthwise side edge on the outer side of which the preceding vehicle Vp is located.

Since the marker image 200 continues to be displayed when the preceding vehicle Vp is located the outer side of the display area DA as long as the preceding vehicle Vp is locked on by the adaptive cruise control, the driver can easily recognize that the adaptive cruise control is being performed.

Specifically, the driver can instantly recognize whether the adaptive cruise control is being continuously performed or not (control is lost or not), from the marker image 200 displayed in the display area DA. Accordingly, the vehicular display device 100 can provide more comfortable driving environment without needlessly confusing the driver.

In one or more embodiments of the present invention, when the preceding vehicle Vp is partially located on the outer side of the vehicle widthwise side edge of the display area DA, the width of the marker image 200 can be reduced depending on the width of the portion of the preceding vehicle Vp located in the display area DA (see display example 1). Since the width of the marker image 200 is reduced, the driver can easily recognize that the adaptive cruise control is being continuously performed when the preceding vehicle Vp moves outside the display area DA.

In one or more embodiments of the present invention, when the entire preceding vehicle Vp is located on the outer side of the vehicle widthwise side edge of the display area DA, the icon 300 indicating the preceding vehicle Vp can be displayed adjacent to the marker image 200 (see display example 2). Since the icon 300 indicating the preceding vehicle Vp is displayed, the driver can more easily recognize that the adaptive cruise control is being continuously performed when the preceding vehicle Vp is not located in the display area DA.

In one or more embodiments of the present invention, the marker image 200 can be moved toward the side of the preceding vehicle Vp as the portion of the preceding vehicle Vp located on the outer side of the vehicle widthwise side edge of the display area DA increases (see display example 3). Moreover, the size of the marker image 200 can be also reduced. Since the marker image 200 moves toward the side, the driver can easily recognize that the adaptive cruise control is being continuously performed when the preceding vehicle Vp moves outside the display area DA.

In one or more embodiments of the present invention, it is possible to move the marker image 200, shaped into the arc about the predetermined position (center CT) in the preceding vehicle Vp, to the side of the preceding vehicle Vp and reduce the length of the arc of the marker image 200 as the portion of the preceding vehicle Vp on the outer side of the vehicle widthwise side edge of the display area DA increases (see display example 4). Since the marker image 200 moves to the side and the size thereof changes, the driver can more easily recognize that the adaptive cruise control is being continuously performed when the preceding vehicle Vp moves outside the display area DA.

Moreover, in this case, the length of the arc of the marker image 200 can be fixed when the predetermined position in the preceding vehicle Vp is away from the vehicle widthwise side edge of the display area DA by the predetermined distance (distance X) or more. Since the marker image 200 continues to be displayed in a fixed size when the preceding vehicle Vp greatly moves away from the display area DA, the driver can easily recognize that the adaptive cruise control is being continuously performed.

In one or more embodiments of the present invention, the marker image 200 with the predetermined width continues to be displayed when the preceding vehicle Vp is located on the outer side of the vehicle widthwise side edge of the display area DA (see display example 5). Accordingly, the driver can easily recognize that the adaptive cruise control is being continuously performed. Moreover, in this case, the distance to the preceding vehicle Vp (width of the preceding vehicle Vp in the display area DA) is the only factor which causes the width of the marker image 200 to change. Accordingly the driver can easily understand and accept that the width of the marker image 200 is associated with only the distance to the preceding vehicle Vp.

In one or more embodiments of the present invention, the thickness of the marker image 200 can be reduced as the portion of the preceding vehicle Vp on the outer side of the vehicle widthwise side edge of the display area DA increases (see display examples 6 and 8). Since the thickness of the marker image 200 is reduced, the driver can easily recognize that the adaptive cruise control is being continuously performed when the preceding vehicle Vp moves outside the display area DA.

In one or more embodiments of the present invention, the color of the marker image 200 is changed as the portion of the preceding vehicle Vp on the outer side of the vehicle widthwise side edge of the display area DA increases (see display examples 7 and 8). Since the color of the marker image 200 is changed, the driver can easily recognize that the adaptive cruise control is being continuously performed when the preceding vehicle Vp moves outside the display area DA.

In one or more embodiments of the present invention, the spatial frequency of the marker image 200 can be changed as the portion of the preceding vehicle Vp on the outer side of the vehicle widthwise side edge of the display area DA increases (see display example 9). Since the marker image 200 is thus displayed to become gradually duller, the driver can easily recognize that the adaptive cruise control is being continuously performed when the preceding vehicle Vp moves outside the display area DA.

In one or more embodiments of the present invention, the temporal frequency of the marker image 200 can be changed as the portion of the preceding vehicle Vp on the outer side of the vehicle widthwise side edge of the display area DA increases (see display example 10). Since the marker image 200 is thus displayed to blink at a gradually increasing frequency, the driver can easily recognize that the adaptive cruise control is being continuously performed when the preceding vehicle Vp moves outside the display area DA.

The examples of the present invention have been described above. However, the present invention is not limited to the above description and it is apparent to those skilled in the art that various changes and modifications can be made.

For example, in one or more of the aforementioned embodiments, as illustrated in FIG. 2, the vehicular display device 100 includes the preceding vehicle detector 110, the determiner 120, the display processor 130, and the HUD image display 140. However, the preceding vehicle detector 110 and the HUD image display 140 are not essential in the vehicular display device 100.

The preceding vehicle detector 110 may be provided as a function of an adaptive cruise control device, and the HUD image display 140 may be used for other image display.

Moreover, although the HUD image display 140 (head-up display) which displays the image reflected by the mirror on the windshield as the virtual image is described in one or more of the aforementioned embodiment as an example, the head-up display is not limited to this type.

For example, the HUD image display 140 may be a combiner type head-up display which uses a transparent panel instead of displaying the image on the windshield FW or a type which directly displays the image on the windshield FW. In other words, the HUD image display 140 according to one or more embodiments of the present invention only has to display information in a manner superimposed on an object viewed by the driver through the windshield FW without making the driver look down.

Although the four-wheel passenger car (including SUV and minivan), the truck, and the bus are given as the examples of the vehicle V in one or more of the aforementioned embodiment, the vehicular display device 100 may be applied to a three-wheeler and a motorcycle.

Although embodiments of the present invention have been described above, it should not be understood that the description and drawings forming part of this disclosure limit the present invention. From this disclosure, various alternative embodiments, examples, and operations techniques will be found by those skilled in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 100 vehicular display device
110 preceding vehicle detector
111 preceding vehicle detecting sensor
113 coordinate detector
115 size detector
120 determiner
121 left-right difference calculator
123 area inside-outside determiner
130 display processor
140 HUD image display
200 marker image
300 icon
DA display area
FW windshield
V vehicle
Vp preceding vehicle

The invention claimed is:

1. A vehicular display device which displays a marker image in a manner superimposed on a preceding vehicle in front of a vehicle when the vehicle is following the preceding vehicle while traveling, comprising:
 a display configured to display an image in a display area provided to overlap a position of a windshield included in the vehicle;

a preceding vehicle detector configured to detect a position of the preceding vehicle;

a display processor configured to cause the display to display the marker image corresponding to the position of the preceding vehicle detected by the preceding vehicle detector; and a determiner configured to determine whether the preceding vehicle is located on an inner side of widthwise edges of the display area of the vehicle or on outer sides of the widthwise edges, based on the position of the preceding vehicle detected by the preceding vehicle detector, wherein, when the determiner determines that the preceding vehicle is located on the outer side of one of the widthwise edges of the display area, the display processor continues to display the marker image in a peripheral portion of a widthwise edge of which the preceding vehicle is located.

2. The vehicular display device according to claim 1,
wherein the display processor displays the marker image below the preceding vehicle when the preceding vehicle is located in the display area, and
wherein the display processor reduces a width of the marker image depending on a width of a portion of the preceding vehicle located in the display area when the preceding vehicle is partially located on the outer side of the widthwise edge of the display area.

3. The vehicular display device according to claim 1, wherein the display processor displays an icon indicating the preceding vehicle adjacent to the marker image when the entire preceding vehicle is located on the outer side of the widthwise edge of the display area.

4. The vehicular display device according to claim 1,
wherein the display processor displays the marker image below the preceding vehicle when the preceding vehicle is located in the display area, and
wherein the display processor moves the marker image toward a side of the preceding vehicle as a portion of the preceding vehicle located on the outer side of the widthwise edge of the display area increases.

5. The vehicular display device according to claim 4, wherein the display processor reduces the size of the marker image while moving the marker image to the side of the preceding vehicle as the portion of the preceding vehicle on the outer side of the widthwise edge of the display area increases.

6. The vehicular display device according to claim 1,
wherein the display processor displays the marker image shaped into an arc about a predetermined position in the preceding vehicle, below the preceding vehicle when the preceding vehicle is located in the display area, and
wherein the display processor reduces a length of the arc of the marker image while turning the marker image about the predetermined position in the preceding vehicle to move the marker image toward a side of the preceding vehicle as a portion of the preceding vehicle on the outer side of the widthwise edge of the display area increases.

7. The vehicular display device according to claim 6, wherein the display processor fixes the length of the arc of the marker image when the predetermined position in the preceding vehicle is away from the widthwise edge of the display area by a predetermined distance or more.

8. The vehicular display device according to claim 1,
wherein the display processor displays the marker image with a predetermined width below the preceding vehicle when the preceding vehicle is located in the display area, and
wherein the display processor continues to display the marker image with the predetermined width even when the preceding vehicle is located on the outer side of the widthwise edge of the display area.

9. The vehicular display device according to claim 8, wherein the display processor changes a color of the marker image as a portion of the preceding vehicle on the outer side of the widthwise edge of the display area increases.

10. The vehicular display device according to claim 9,
wherein the display processor displays the marker image in a first color when the preceding vehicle is located in the display area,
wherein the display processor displays the marker image in a second color different from the first color when the preceding vehicle is partially located on the outer side of the widthwise edge of the display area, and
wherein the display processor displays the marker image in a third color different from the first color and the second color when the entire preceding vehicle is located on the outer side of the widthwise edge of the display area.

11. The vehicular display device according to claim 8, wherein the display processor reduces a thickness of the marker image as a portion of the preceding vehicle on the outer side of the widthwise edge of the display area increases.

12. The vehicular display device according to claim 8, wherein the display processor changes a spatial frequency of the marker image as a portion of the preceding vehicle on the outer side of the widthwise edge of the display area increases.

13. The vehicular display device according to claim 8, wherein the display processor changes a temporal frequency of the marker image as a portion of the preceding vehicle on the outer side of the widthwise edge of the display area increases.

14. A vehicular display method using a display configured to display an image in a display area provided to overlap a position of a windshield included in the vehicle and a processor configured to cause the display to display a marker image in a manner superimposed on a preceding vehicle in front of a vehicle when the vehicle is following the preceding vehicle while traveling, comprising:
causing, via the processor, to display the marker image corresponding to a position of the preceding vehicle, in the display area; and
when the preceding vehicle is located on an outer side of one widthwise side edge of the display area of the vehicle, causing, via the processor, to continuously display the marker image in a peripheral portion of a widthwise edge of which the preceding vehicle is located.

* * * * *